United States Patent

Stjernström

[11] Patent Number: 6,003,622
[45] Date of Patent: Dec. 21, 1999

[54] DRILL TUBE FOR USE IN UPWARD ROCK DRILLING

[75] Inventor: Karl-Axel Stjernström, Fageersta, Sweden

[73] Assignee: Uniroc AB, Fagersta, Sweden

[21] Appl. No.: 08/985,004

[22] Filed: Dec. 4, 1997

[30] Foreign Application Priority Data

Dec. 19, 1996 [SE] Sweden ................................. 9604669

[51] Int. Cl.⁶ .................................................. F16K 15/00
[52] U.S. Cl. ........................ 175/218; 166/325; 137/515.5
[58] Field of Search .................... 166/325, 327; 175/318, 218; 137/515.5, 515.7, 534, 539

[56] References Cited

U.S. PATENT DOCUMENTS

| | | | |
|---|---|---|---|
| 2,223,509 | 12/1940 | Brauer | 137/67 |
| 2,943,639 | 7/1960 | Smith | 137/515.7 |
| 3,051,196 | 8/1962 | Miller | 137/516.29 |
| 3,548,868 | 12/1970 | Mullaney, III | 137/515.5 |
| 4,532,958 | 8/1985 | Napolitano | 137/454.2 |
| 4,655,248 | 4/1987 | Chalaire | 137/528 |

FOREIGN PATENT DOCUMENTS 456269  5/1986  Sweden.
503367  10/1994  Sweden.

OTHER PUBLICATIONS

Liljebrand, "Extended drill tube element for percussive top hammer drilling including specialised non-return valve allowing the drill tube element to be used for drilling in all directions, partic. upwardly", abstract of WIPO document 9425723, Nov. 1994.

*Primary Examiner*—David Bagnell
*Assistant Examiner*—Sunil Singh
*Attorney, Agent, or Firm*—Mark P. Stone

[57] ABSTRACT

Drill tube provided with a check valve and comprising a tube (1) and two end pieces (2,3). One of the end pieces comprises a first contact surface (4) for limiting the movement of a valve body (5) when the check valve is open and a second contact surface (6) against which a valve seat (7) rests. The valve seat is held in place by a lock ring (8) which preferably has circular cross section. The cooperating surfaces (12,11) on the valve body and valve seat are plane.

2 Claims, 1 Drawing Sheet

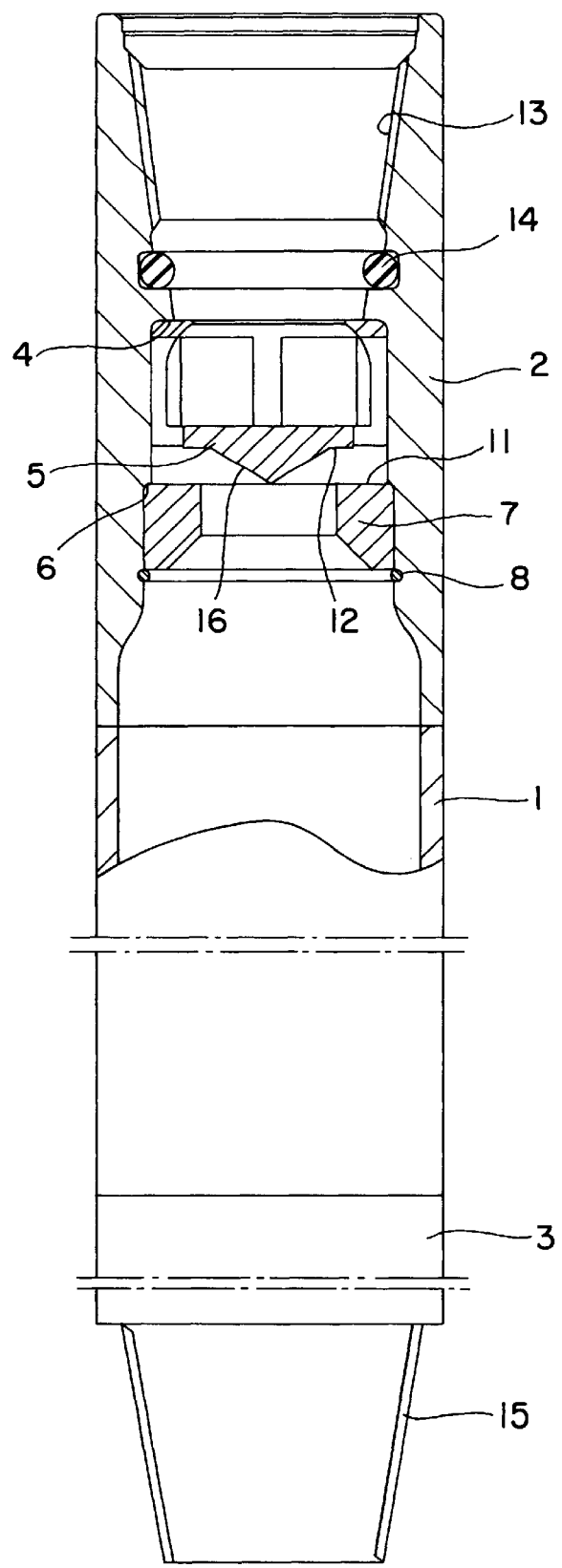

DRILL TUBE FOR USE IN UPWARD ROCK DRILLING

BACKGROUND OF THE INVENTION

The present invention relates to a drill tube for use in upward rock drilling in which liquid is conducted through a drill string, in which the drill tube is a part, for driving a in-the-hole drilling machine and/or for flushing the drill hole.

When drilling long upwardly directed drill holes it is desirable to provide the drill tubes with a check valve so that the entire drill string is not emptied of water when further drill tubes are to be added to the drill string. A previously known solution, SE-B-456 269, has the drawback that the friction welded tube joints at the check valves give service life problems for the drill tubes.

SUMMARY OF THE INVENTION

The present invention is directed to improvements to drill tubes which substantially improve the service life of the known devices. In accordance with the present invention, a drill tube comprising a tube and a check valve has two end pieces, one of which has a first contact surface for limiting movement of a valve body when the check valve is open, and a second contact surface against which a valve seat is held by a lock ring arranged in said one end piece. In the preferred embodiment of the invention, the lock ring is circular in cross section.

BRIEF DESCRIPTION OF THE DRAWINGS

The single drawing FIGURE schematically illustrates a drill tube in accordance with the preferred embodiment of the present invention, shown partly in section during normal operating condition.

DESCRIPTION OF THE BEST MODES FOR CARRYING OUT THE INVENTION

The embodiment of the invention shown in the drawing comprises a tube 1 with which two end pieces 2,3 are connected, e.g. by means of friction welding. The end piece 2, which in upward drilling is the upper end of the drill tube, is provided with an internal thread 13 for connection to other elements in a drill string, e.g. another drill tube, an in-the-hole drilling machine or a drill bit. The end piece 2 is furthermore provided with a seal 14 for sealing against another drill string element. The end piece 3 is provided with an external thread 15 for connection to other drill string elements, e.g. another drill tube, a rotary motor or an impact drilling machine. In end piece 2 a first contact surface 4 is arranged to limit the upward movement of a valve body 5. The valve body 5 forms together with a valve seat 7 a check valve. The check valve aims at preventing downward liquid flow when adding tubes. End piece 2 is provided with a second contact surface 6 against which the valve seat 7 rests. The valve seat is held in place by a lock ring 8. For strength reasons it is advantageous to use a lock ring with circular cross section. In order to obtain good through flow through the check valve the valve seat 7 is formed with a plane surface 11 which cooperates with a plane annular surface 12 on the valve body 5. In order to improve the flow conditions in the check valve the valve body 5 is provided with a conical part 16.

I claim:

1. A tube drill for upward drilling comprising a tube (1), two end pieces (2,3) provided with threads for connection to other elements in a drill string and connected with either end of said tube (1), and a check valve in one of the end pieces characterized in that said one end piece (2) internally comprises a first contact surface (4) to limit the movement of a valve body (5) when the check valve is open, a second contact surface (6) against which a valve seat (7) rests, said valve body (5) comprising a plane surface (12) to sealingly cooperate with a plane surface (11) on said valve seat (7) for preventing fluid from flowing downwardly through the valve body when said body is in its sealing position and said valve seat (7) is held in place against said second contact surface (6) by means of a lock ring (8) arranged in said one end piece (2).

2. The drill tube according to claim 1, characterized in that said lock ring (8) has a circular cross section.

* * * * *

UNITED STATES PATENT AND TRADEMARK OFFICE
CERTIFICATE OF CORRECTION

PATENT NO. : 6,003,622

DATED : December 21, 1999

INVENTOR(S) : Karl-Axel Stjernstrom

It is certified that error appears in the above-identified patent and that said Letters Patent is hereby corrected as shown below:

Claim 1, Line 4 (Col. 2, Line 27):
After "pieces", add - -,- -.

Claim 1, Line 12 (Col. 2, Line 35):
Before "body" (second occurrence), add - -valve- -.

Claim 1, Line 12 (Col. 2, Line 35):
After "position", add - -,- -.

Signed and Sealed this

Twenty-fifth Day of July, 2000

Attest:

Q. TODD DICKINSON

Attesting Officer

Director of Patents and Trademarks